United States Patent Office 3,356,460
Patented Dec. 5, 1967

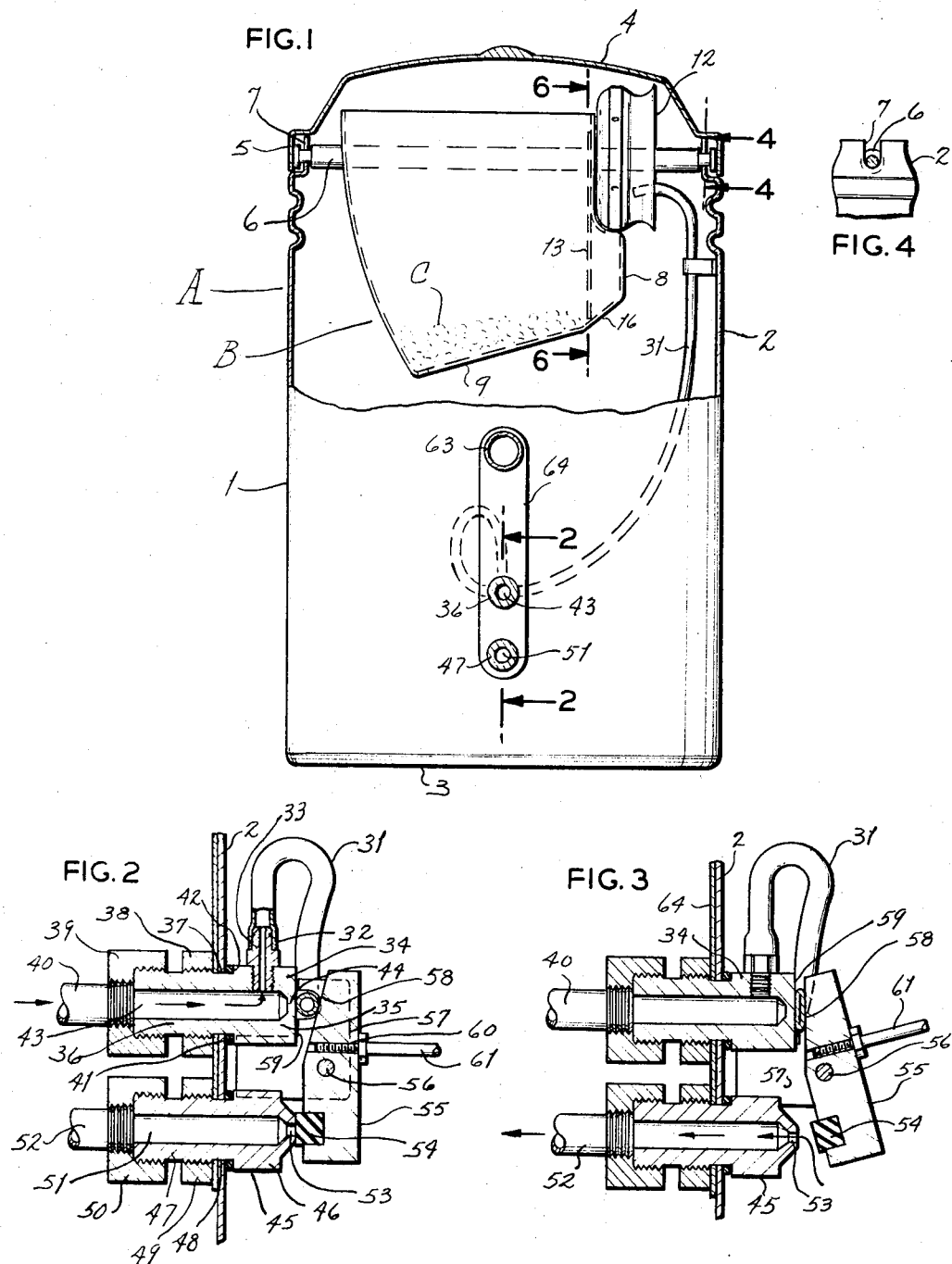

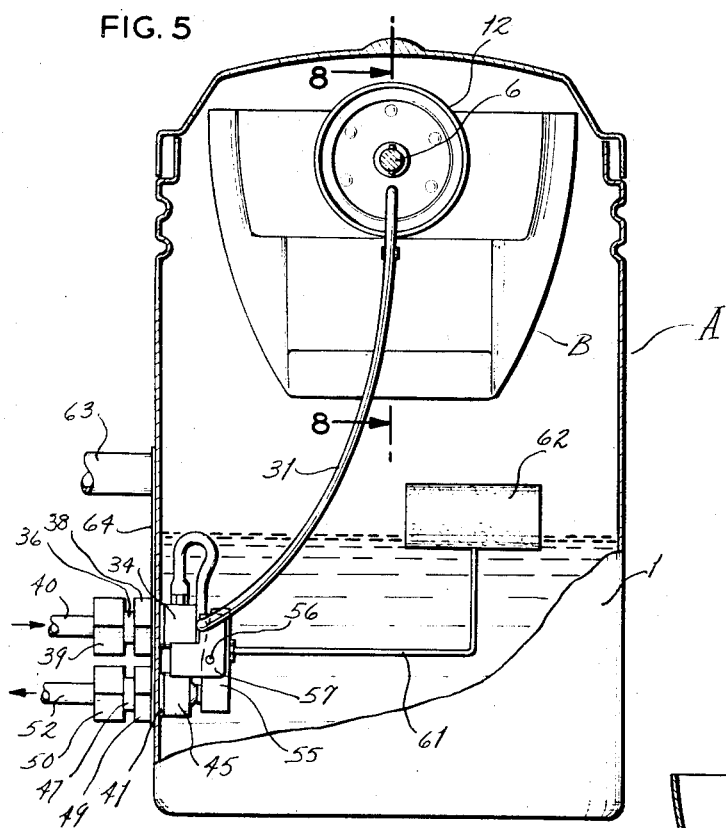
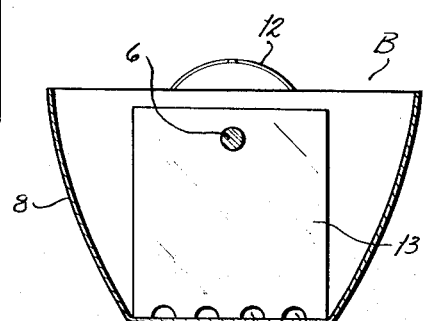
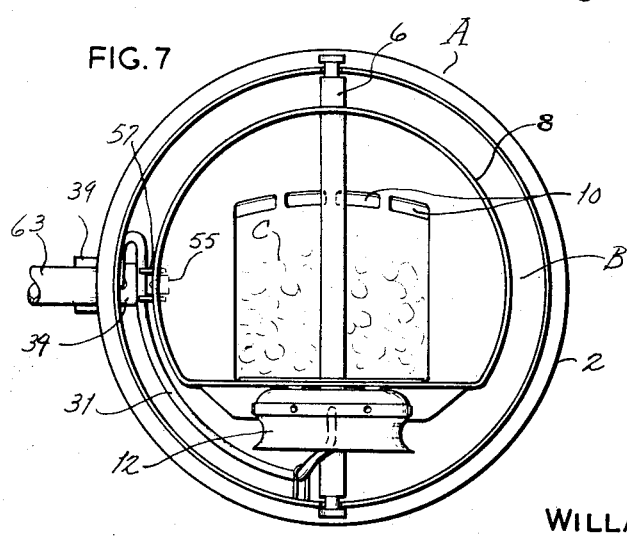

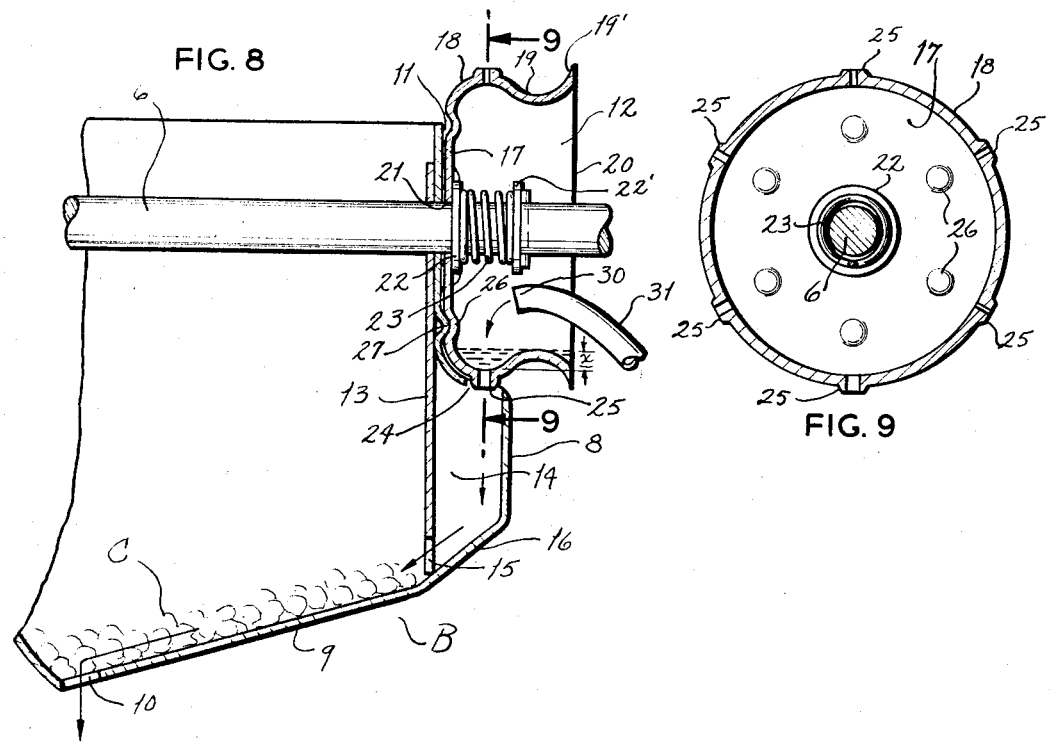
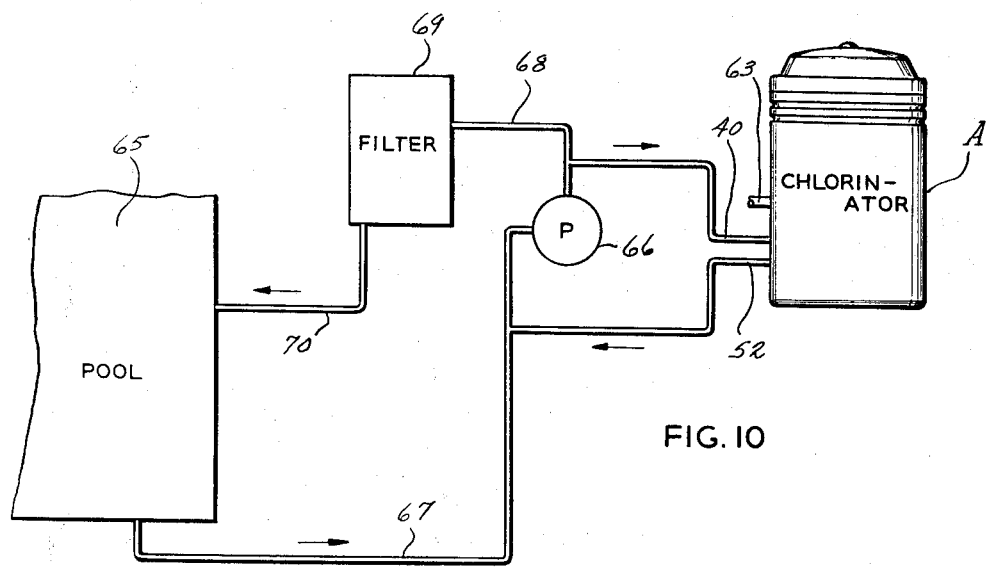

3,356,460
LIQUID TREATMENT APPARATUS
Willard Van Beuren King and David W. Kratz, St. Louis, Mo., assignors to King-Kratz Corporation, St. Louis, Mo., a corporation of Missouri
Filed Jan. 13, 1964, Ser. No. 337,294
8 Claims. (Cl. 23—272)

This invention relates in general to liquid treatment and, more particularly, to an apparatus for economical and effective introduction of sanitizing agents into a liquid circulating system It is an object of the present invention to provide an apparatus for treating liquids in confined circulating systems, which is adapted for introducing a normally solid sanitizing agent in dissolved form into the liquid to be treated, and the operation of which maintains the liquid in the system at the desired concentration adequate for effective germicidal activity without wastage of the treatment agent.

It is another object of the present invention to provide an apparatus for treating liquids in confined circulating systems which is adapted for controlled flow of the circulating liquid through a supply of a normally solid treatment chemical for dissolution of such chemical in the liquid.

It is another object of the present invention to provide an apparatus for treating liquids in circulating systems wherein the sanitizing agent is introduced into the liquid in solution with means for controlling the introduction of such agent responsive to a predetermined liquid pressure.

It is an additional object of the present invention to provide a liquid treatment apparatus of the character stated incorporating novel valve means for presentation of the solvent to the sanitizing agent.

It is a further object of the present invention to provide a liquid treatment apparatus of the character stated which embodies novel flow control means for subjecting the liquid to be treated to an normally solid sanitizing agent for dissolution of the latter in the liquid prior to recirculation through the related system.

It is an additional object of the present invention to provide a chlorine treatment apparatus for swimming pools which is adapted for utilizing a solid soluble source of chlorine and for subjecting the pool liquid in a trickle-like manner to the source of chlorine for dissolution of the latter therein and for returning to the swimming pool; the use of which apparatus deters the entry into the pool circulating system of insoluble residues or precipitates.

It is a still further object of the present invention to provide a chlorinator for use with the circulating systems of swimming pools which operates automatically; which is most economical in usage as well as in manufacture; which does not require frequent attention; which is most reliable and durable in usage, having a simplicity of components; and which may be easily incorporated in existing swimming pool feeding systems without requiring costly modification.

Other objects and details of the invention will become apparent from the following description, when read in connection with the accompanying drawings (three sheets), wherein:

FIGURE 1 is a side view of the liquid treatment apparatus constructed in accordance with and embodying the present invention, with the side wall of the tank being partially broken away.

FIGURE 2 is a vertical transverse sectional view taken on the line 2—2 of FIGURE 1, showing the tank intake valve open and the tank outlet valve closed.

FIGURE 3 is a vertical transverse sectional view taken substantially on the line 2—2 of FIGURE 1, showing the tank intake valve closed and the tank outlet valve open.

FIGURE 4 is a vertical transverse sectional view taken on the line 4—4 of FIGURE 1.

FIGURE 5 is an end view of the liquid treatment apparatus, with the end wall partially broken away.

FIGURE 6 is a vertical transverse sectional view taken on the line 6—6 of FIGURE 1.

FIGURE 7 is a top plan view of the apparatus with the cover removed.

FIGURE 8 is a fragmentary vertical transverse sectional view taken on the line 8—8 of FIGURE 5.

FIGURE 9 is a vertical transverse sectional view taken on the line 9—9 of FIGURE 8.

FIGURE 10 is a diagrammatic plan of a swimming pool circulating system incorporating the treatment apparatus of the present invention.

Referring now by reference characters to the drawings which illustrate the preferred embodiment of the present invention, A designates a liquid treatment apparatus for use with liquid systems, such as for potable water, swimming pools, etc., which incorporates a tank 1 of selected capacity and being constructed of any suitable, sturdy, non-corrosive material; said tank 1 having a preferably annular side wall 2 and a base wll 3, with its upper end being normally open. Removably provided upon the upper end of tank 1 is a cover or closure 4 having a depending marginal flange 5 for embracing the outer upper portion of tank 1 to inhibit undesired accidental displacement therefrom.

Extending diametrially across the upper end of tank 1 is a shaft 6 supported at its ends in opposed trunnions 7 formed in the upper margin of tank side wall 2. Supported upon shaft 6 for rockable movement is a process vessel indicated generally B, being fabricated of any suitable nonreactive material, such as, for instance Plexiglas of general bowl-shape, being open at its top, having a substantially annular side wall 8 and a flat, inclined base wall 9 which constitutes a flow plate. At the lower end of base wall 9 there is provided a plurality of ports 10 opening downwardly into the interior of tank 1. In its portion adjacent the upper end of base wall 9, side wall 8 is contoured to present an upper recessed or flattened section 11 for accommodating a flow control member 12 mounted on shaft 6. Provided within process vessel B is an upstanding flow directing plate 13 extending across the upper end of base wall 9 and with its upper portion in surface-wise abutment against the confronting face of flattened section 11 of side wall 8. The lower part of flow directing plate 13, and the adjacent portions of side wall 8 cooperate to define a liquid-receiving chamber 14 located immediately beneath flow control member 12. Flow directing plate 13 is provided with a plurality of openings 15 in its bottom margin for establishing communication between said chamber 14 and the interior of vessel B, so that liquid entering chamber 14 may flow downwardly along base wall or flow plate 9 for discharge through ports 10. It will be noted that the bottom wall 16 of chamber 14 is inclined at a slightly greater angle than base wall 9, for conducting to relatively rapid emission of liquid from chamber 14.

Vessel B will be substantially filled with a supply of a solid, soluble liquid treatment material, such as, for instance, calcium hypochlorite, as indicated at C, which will rest upon base wall or flow plate 9.

Flow control member 12 comprises a receptacle having an end wall 17 and an outwardly rounded, annular side wall 18 continuous with a relatively constricted neck 19. Said member 12 flares radially outwardly from neck 19, as at 19′, and is open at its end 20 opposite end wall 17 for overflow purposes. The relative depth of side wall 18, being determined by the distance between the inner faces of the base of said wall 18 and neck 19, as indicated by $x$ in FIGURES 1 and 8, is critical to the proper operation of the apparatus as described below. Shaft 6 projects through an opening 21 in end wall 17. Carried on shaft 6 within member 12 are spaced apart collars 22, 22', the former being engaged to said member 12 for confinement of a spring 23 encircling shaft 6 and urging flow control member 12 against the flattened section 11 of side wall 8 for assuring reception within an inlet opening 24 provided in the upper wall of chamber 14 of the selected one of a series of nozzles 25 integrally arranged circumferentially of side wall 18. Nozzles 25 are of varying diameter for liquid metering. Flow control member 12 is rotatable about shaft 6 for permitting of alignment of the selected nozzle 25 with opening 24 and is maintainable in requisite position by means of indentations 26 integrally formed in end wall 17 and a complementary projection 27 formed on the confronting portion of side wall 8 of vessel B. Indentations 26 are radially parallel to the respective, corresponding nozzles 25 so that determination of positionment of member 12 is easily accomplished. In order to turn member 12, the user will grasp the flared portion 19' and pull outwardly thereby stressing spring 23 while disengaging the ertswhile engaged particular indentation 26 from projection 27, causing freeing of member 12 for travel through the required arc to locate the selected nozzle 25 with opening 24. Thereon member 12 is released and the related indentation 26 will engage projection 27, by urging of spring 23.

In view of the foregoing, it will be seen that upon selected adjustment of member 12 a nozzle 25 of chosen diameter may be disposed registeringly with opening 24 for liquid discharge therethrough at a rate of flow commensurate with the diameter of the selected nozzle 25 and the head created by the liquid being received in the lower portion of side wall 18. Thus, the depth thereof, which has been appropriately predetermined, assures of the maintenance of a constant pressure on the liquid flow through the selected nozzle 25 whereby the differential in diameter of the said nozzle 25 will introduce a single, effective rate of flow variant whereby the speed with which the solid agent C is dissolved is reliably controlled. Liquid, will, thus, descend from member 12 into chamber 14, and, due to the angle of inclination of bottom wall 16 thereof, will be impelled by gravity to flow downwardly through openings 15 and thence toward the lower end of base wall or flow plate 9 while permeating the lower portion of the mass of the material C in vessel B. The liquid which is now a solution is discharged into tank 1 through ports 10. Thus, the liquid utilized constitutes a solvent for the material C so that during the flow therethrough, said liquid will cause the contacted portions of such material to dissolve. By selection of the appropriate nozzle 25 of member 12, the rate of flow of the liquid-solvent is easily adjusted because of the constant pressure developed by the liquid within side wall 18. Alteration of the angle of base wall or flow plate 9 to the horizontal will expectedly affect the rate of flow, however, it has been found that a relatively limited exposure of the liquid to material C is requisite for developing a solution of desired concentration for sanitizing purposes. Accordingly, the angle of the base wall or flow plate 9 to the horizontal must not be too steep so as to deny adequate solvent action nor too shallow so as to conduce to a stronger concentration than needed. It has been found that the disposition of flow plate 9 at an angle of approximately 14 degrees to the horizontal has produced excellent results. By maintaining flow plate 9 fixed at such angle, the selected rate of flow may be made greater by the alignment of a smaller nozzle 25 with opening 24. Consequently, member 12 provides a positive, yet simple, means for adjusting the flow rate.

Material C will slowly be dissolved so that through adequate size of vessel B, frequent replenishment of the supply of material C will not be requisite, thereby obviating the need for substantially constant attendance. If material C should not dissolve in a uniform manner, resulting a a greater quantity of such material being toward one side portion of vessel B than the other, the imbalance created thereby will, through gravity, cause a rocking of vessel B about shaft 6 so that the flow of liquid will tend toward the relatively greater quantity of material C for maximum dissolution thereof, until a balance has been restored whereupon vessel B will swing returningly into a normal upright position. It will be observed that the flow of liquid through material C will be in a generally trickle-like fashion so as to assure of proper dissolution.

Liquid is delivered to member 12 through the upper, downwardly directed end 30 of a, preferably flexible, pipe 31 extending below process vessel B with its lower extremity being diametrally enlarged, as indicated at 32, for receiving a coupling 33 for engagement to an intake valve 34. Said valve 34 being of general cylindrical contour, comprises a body having an inner portion 35 and a diametrally reduced outer portion 36 projecting through an opening 37 in the wall of tank 1. Valve outer portion 36 being externally threaded for engaging a retaining nut 38; and an adapter 39 for securement to a supply pipe 40; there being a gasket 41 surrounding said outer portion 36 and being gripped between the inner face of the wall of tank 1 and the confronting shoulder, as at 42, of valve inner portion 35 to provide a fluid-proof seal. Valve 34 is provided with a main bore 43 communicating at its outer end with pipe 40, and adjacent its inner end with flexible pipe 31 through coupling 33. Bore 43 is closed at its inner extremity as at 44.

Situated downwardly of valve 34 and in vertical alignment therewith is an outlet valve 45 being also of general cylindrical form and having an inner portion 46 and an outer diametrally reduced portion 47, which latter extends through an opening 48 in the side wall of tank 1 and is externally threaded for engaging a retaining nut 49, and for engaging an adapter 50. Valve body 45 is provided with a bore 51 connected at its outer end by adapter 50 with a liquid return pipe 52 and communicating at its inner end with a port 53, of relatively reduced diameter, formed in the end of said valve body 45.

Provided for valve closing cooperation with port 53 is a resilient closure 54 carried in the lower end of a lever 55 which is adapted for swingable movement within a vertical plane about a transverse pivot rod 56 extending through said lever and being secured at its ends to opposed parallel mounting plates 57 secured fixedly to the lateral faces of valves 37, 45. Upwardly of pivot rod 56 and on its valve-confronting face, lever 55 is upwardly and inwardly inclined to define a clamping surface 58 for cooperation with the inner end face 59 of valve 34 for flow-stopping compression of a portion of flexible pipe 31 directed therebetween. Lever 55 is drilled and tapped as at 60 for threaded engagement to the outer, externally threaded end of an L-shaped arm 61 which latter at its inner upper end mounts a float 62. Tank 1 may also be provided with an overflow pipe 63. As shown in FIGURES 1 and 2, valves 37 and 45 may be carried upon a plate 64 for unitary mounting within tank 1.

Referring now to FIGURE 1, it will be noted that the lower portions of tank 1, beneath process vessel B, constitute a reservoir for liquid which has been treated by dissolution therein of the particular sanitizing material C. The level of the liquid in the reservoir will thus control the operation of valves 34, 45, since lever 55 will rock about pivot rod 56 responsively to the raising or lowering of float 62. Thus, when the level of liquid in tank 1 has descended sufficiently to lower float 62 to cause an inward pulling on the upper end of lever 55, outlet valve 45 will be closed by coaction of closure member 54 and nozzle 46 (see FIGURE 2) so that escape of liquid from tank 1 will be temporarily arrested. Such action of lever 55 will cause a commensurate inward withdrawal of the upper end thereof so as to relieve the clamping of, or compression upon, flexible pipe 31, thereby permitting supply flow of liquid therethrough by virtue of the hydraulic pressure of the particular system for consequent admission to vessel B.

After the level in the reservoir of tank 1 has been appropriately elevated, float 62 will be raised with consequent reverse rocking of level 55 into the state shown in FIGURE 3 wherein by outward rocking of the upper end of said lever 55 clamping surface 58 will cause closing of pipe 31 to discontinue supply of liquid to vessel B, with attendant cessation of dissolution of material C. Simultaneously, the lower end of lever 55 will rock upwardly and inwardly for opening said outlet valve 45 to permit egress of treated liquid from the reservoir for recirculation through the system.

It will thus be noted that the valve arrangement of the present invention, comprised substantially of inlet valve 34, outlet valve 45, and lever 55, constitutes a remarkably simple, but highly effective unit for positively assuring of desired flow control yet having a marked economy of parts for consistent reliable and positive action.

Reference is now made to FIGURE 10, which, for purposes of showing the utilization of the present invention in a closed liquid circulating system, illustrates a swimming pool system comprising a swimming pool 65, a pump 66 with its low pressure or suction side connected by a conduit 67 with pool 65 and with its high pressure or outlet side connected through a pipe 68 to a filter 69 which latter, in turn, communicates with the upper portion of pool 65 by a return conduit 70. Pump 66 will be customarily operated on a constant running basis for circulating the pool water so as to effect, through operation of filter 69, the removal of unwanted impurities. Liquid treatment apparatus A, or in this case, preferably a chlorinator, is connected across pump 66, as a by-pass, with supply pipe 40 extending from the high pressure or discharge side of pump 66 and with return pipe 52 being connected to the low pressure side of pump 66.

It is recognized that apparatus A, or chlorinator in this case, could be maintained in a fixed position lower than the level of the hydraulic head maintained within pool 65 to allow a gravitational flow of liquid through the system, thereby dispensing with pump 66 to operate in an intake capacity and requiring only the inclusion of a small load pump for returning the treated fluid to the pool.

The present invention may be readily incorporated in existing liquid systems without requiring costly and laborious modifications of the same, since only connection across the associated pump is required. The operation of apparatus A is manifestly most economic as there is obviated the necessity of frequent inspections and with apparatus A being of adequate volume, the system will automatically operate for extended periods of time. The maximum economy in consumption of the sanitizing agent will be assured through requisite adjustment of liquid flow through nozzles 25 so that the resulting solution will not have unnecessary high concentration. Furthermore, the present invention renders obsolete the costly and customarily delicate metering devices which have been utilized heretofore for depositing the sanitizing compound in the liquid to be treated.

It should be understood that changes and modifications in the formation, construction, arrangement, and combination of the seveal parts of the Liquid Treatment Apparatus may be made and substituted for these herein shown and described without departing from the nature and principle of our invention.

Having thus described our invention, what we claim and desire to secure by Letters Patent is:

1. In a liquid treatment apparatus being a tank constituting a liquid-containing reservoir with vertically aligned inlet and outlet, the improvement comprising an inlet valve mounted in said tank inlet, an outlet valve mounted in said tank outlet, said inlet and outlet valves being axially parallel and having inner portions extending into said tank, a valve operating lever disposed across the inner extending portions of said valves, means mounting said lever for rockable movement in a vertical plane for simultaneous reciprocal opening and closing of said inlet and outlet valves, and a float provided in said reservoir connected to said valve operating lever for actuating same responsive to the level of liquid in said reservoir.

2. A liquid treatment apparatus comprising a tank-forming member constituting a reservoir for treated liquid, a process vessel provided in the upper portion of said tank-forming member, said vessel receiving a supply of a normally solid agent soluble in the liquid to be treated, a flow plate inclined at an angle to the horizontal constituting the base of said vessel, said vessel further having a chamber for liquid to be treated, means connecting said chamber and the upper projecting portion of said flow plate, said flow plate at its lower end communicating with said reservoir, means for delivering liquid to said chamber responsive to the level of treated liquid in said reservoir, said chamber having an inlet opening, flow c ntrol means provided adjacent said chamber, and comprising a rotatably mounted receptacle, having a plurality of discharge openings of varying diameter for coaxial registration with said chamber inlet opening, and means for maintaining said receptacle in selected position.

3. A liquid treatment apparatus as defined in claim 2 and further characterized by flow directing means provided adjacent said flow plate for establishing a plurality of liquid flow paths through the supply of treating agent.

4. A liquid treatment apparatus having a tank constituting a liquid-containing reservoir with liquid inlet and liquid outlet, the improvement comprising a valve for said inlet and outlet mounted within said tank, said valve being pivotally mounted at the inlet and outlet such that upon pivotal movement in one direction the valve opens the inlet and closes the outlet and upon pivotal movement in the opposite direction the valve closes the inlet and opens the outlet, a float provided in said reservoir, means connecting said float and said valve operatingly for causing the pivotal movements responsive to the level of liquid in said reservoir.

5. A liquid treatment apparatus comprising a process vessel for receiving a normally solid agent soluble in the liquid to be treated, said vessel further having a chamber for liquid to be treated, said chamber having an inlet, liquid flow directing means between said chamber and said vessel, flow control means provided adjacent said chamber and comprising a rotatably mounted receptacle having a plurality of discharge members of varying diameter for preselected registration with said chamber inlet and means providing liquid flow to said flow control means.

6. A liquid treatment apparatus comprising a tank-forming member constituting a reservoir for treated liquid, a process vessel provided in the upper portion of said tank-forming member, means defining first and second chambers within said vessel, said first chamber receiving a supply of normally solid agent soluble in the liquid to be treated, a flow plate inclined at an angle to the horizontal constituting the base of the first chamber, said second chamber provided for liquid to be treated, means connecting said second chamber and the upper projecting portion of said flow plate, said flow plate at its lower end communicating with said reservoir, means for delivering liquid to said second chamber responsive to the level of treated liquid in said reservoir, said tank-forming member having an inlet, there being a source of liquid to be treated under pressure connected to said inlet, said tank-forming member further having an outlet, a valve disposed within said tank-forming member for said inlet and said outlet, said process vessel's second chamber being connected to said inlet, said reservoir being connected to said outlet, said valve being pivotally mounted at the inlet and outlet such that upon pivotal movement in one direction the valve opens the inlet and closes the outlet and upon pivotal movement in the opposite direction the valve closes the inlet and opens the outlet, and said means for delivery of liquid including a float in said reservoir engaged to said valve for causing the pivotal movements responsive to the liquid level in the reservoir.

7. The combination of a liquid circulating system, with a liquid treatment apparatus comprising a tank-forming member constituting a reservoir having a liquid inlet and a liquid outlet in circuit with said system, valves within said tank-forming member for said outlet and said inlet, means for opening one of said valves while simultaneously closing the other of said valves responsive to the level of liquid in said reservoir, a process vessel communicating with said reservoir, said vessel receiving a supply of normally solid agent soluble in the liquid to be treated, said process vessel having an inlet opening, a cylindrical flow control member having an annular side wall rotatably mounted exteriorly of said process vessel adjacent said inlet opening, means connecting said liquid inlet with said flow control member, a plurality of nozzles provided circumferentially of said side wall, each of said nozzles being of different diameter for liquid metering, said flow control member being adapted for rotation for placing individual nozzles in coaxial registration with said inlet opening for liquid discharge thereinto for presenting the liquid to be treated to said agent for flow therethrough and into said reservoir.

8. A liquid treatment apparatus comprising a process vessel having first and second chambers, said first chamber provided for receiving a normally solid agent soluble in the liquid treated, a flow plate inclined to the horizontal extending across the lower end, and constituting the base of said first chamber, said second chamber presented for receiving liquid to be treated and having an inlet opening, means for directing the flow of liquid to be treated disposed between said first and second chambers, means for discharge of treated fluid from said vessel, collecting means for liquid treated in communication with the lower end of said flow plate, said vessel having a flattened portion adjacent said inlet opening of said second chamber, a flow control member having an end wall and an annular side wall, means for directing liquid to said flow control member, said flow control member being rotatably mounted on said vessel with said end wall confronting said flattened portion and said side wall confronting the inlet opening of said second chamber, a plurality of nozzles provided circumferentially of said side wall for registering with said inlet opening for liquid discharge therethrough, resilient means for biasing said flow control member into operable position.

References Cited

UNITED STATES PATENTS

| | | | |
|---|---|---|---|
| 1,208,274 | 12/1916 | Besler | 137—68 X |
| 2,412,106 | 12/1946 | Swartz | 23—311 |
| 2,738,323 | 3/1956 | Tepas | 23—272 |
| 2,820,701 | 1/1958 | Leslie | 210—169 X |
| 3,145,087 | 8/1964 | Walker | 23—311 X |

FOREIGN PATENTS

| | | |
|---|---|---|
| 293,683 | 1/1914 | Germany. |
| 121,770 | 1/1919 | Great Britain. |

REUBEN FRIEDMAN, *Primary Examiner.*

C. DITLOW, *Assistant Examiner.*